(12) United States Patent
Kummer et al.

(10) Patent No.: US 11,480,004 B2
(45) Date of Patent: Oct. 25, 2022

(54) SPINDLE DRIVE ASSEMBLY AND VEHICLE FLAP WITH A SPINDLE DRIVE ASSEMBLY

(71) Applicant: U-SHIN DEUTSCHLAND ZUGANSGSSYSTEME GMBH, Erdweg (DE)

(72) Inventors: Frank Kummer, Erdweg (DE); Eric Bittner, Erdweg (DE); Nicolas Lejeune, Erdweg (DE)

(73) Assignee: U-SHIN DEUTSCHLAND ZUGANSGSSYSTEME GMBH, Erdweg (DE)

( * ) Notice: Subject to any disclaimer, the term of this patent is extended or adjusted under 35 U.S.C. 154(b) by 246 days.

(21) Appl. No.: 16/768,126

(22) PCT Filed: Nov. 20, 2018

(86) PCT No.: PCT/EP2018/081966
§ 371 (c)(1),
(2) Date: May 29, 2020

(87) PCT Pub. No.: WO2019/105810
PCT Pub. Date: Jun. 6, 2019

(65) Prior Publication Data
US 2020/0332585 A1  Oct. 22, 2020

(30) Foreign Application Priority Data
Nov. 30, 2017  (DE) ...................... 10 2017 128 391.9

(51) Int. Cl.
*E05F 15/622*  (2015.01)
*F16H 25/20*  (2006.01)

(52) U.S. Cl.
CPC .......... *E05F 15/622* (2015.01); *F16H 25/20* (2013.01); *E05Y 2201/11* (2013.01); *E05Y 2201/43* (2013.01); *E05Y 2201/702* (2013.01); *E05Y 2600/40* (2013.01); *E05Y 2900/546* (2013.01); *F16H 2025/2087* (2013.01)

(58) Field of Classification Search
None
See application file for complete search history.

(56) References Cited

U.S. PATENT DOCUMENTS

| 4,851,729 | A | * | 7/1989 | Baines | ..................... | H02K 1/17 |
| | | | | | | 310/239 |
| 9,080,366 | B2 | * | 7/2015 | Schiegel | ............... | E05F 15/622 |
| 10,141,813 | B2 | * | 11/2018 | Cheong | ..................... | H02K 5/22 |
| 10,544,615 | B2 | * | 1/2020 | Takizawa | ................ | F16H 25/20 |

(Continued)

FOREIGN PATENT DOCUMENTS

DE  102014109460 A1  1/2016

*Primary Examiner* — Marcus Menezes
(74) *Attorney, Agent, or Firm* — Dilworth IP, LLC

(57) ABSTRACT

A spindle drive assembly for opening or closing a vehicle flap, having a spindle drive assembly housing extending along a spindle drive axis and a spindle drive motor arranged in the spindle drive assembly housing. The motor shaft of the spindle drive motor is arranged substantially coaxially with the spindle drive axis. Furthermore, the spindle drive motor is supported in the spindle drive assembly housing in a rotationally fixed manner in relation to the spindle drive axis by an interlocking fit. In addition, a vehicle flap with such a spindle drive assembly.

10 Claims, 11 Drawing Sheets

(56) References Cited

U.S. PATENT DOCUMENTS

| | | | | |
|---|---|---|---|---|
| 11,142,938 B2* | 10/2021 | Kummer | ............... | E05F 15/622 |
| 2015/0333591 A1* | 11/2015 | Cheong | ............... | H02K 13/006 |
| | | | | 310/71 |
| 2019/0284862 A1* | 9/2019 | Buchheim | ................. | F16F 3/04 |
| 2020/0277816 A1* | 9/2020 | Yamagata | ............. | E05F 15/622 |
| 2020/0291710 A1* | 9/2020 | Kummer | ................ | F16H 25/20 |
| 2020/0355009 A1* | 11/2020 | Kummer | ................ | F16H 25/20 |
| 2021/0040785 A1* | 2/2021 | Wittelsburger | ......... | E05F 1/105 |
| 2021/0230923 A1* | 7/2021 | Yokozawa | ................ | H02P 6/08 |
| 2022/0003033 A1* | 1/2022 | Bittner | ................. | F16F 9/3242 |

* cited by examiner

SPINDLE DRIVE ASSEMBLY AND VEHICLE FLAP WITH A SPINDLE DRIVE ASSEMBLY

FIELD OF THE INVENTION

The invention relates to a spindle drive assembly for opening and/or closing a vehicle flap.

The invention further relates to a vehicle flap, in particular a vehicle hatch or tailgate or a vehicle trunk lid, with such a spindle drive assembly.

BACKGROUND OF THE INVENTION

Vehicle flaps and spindle drive assemblies of the type initially mentioned are known from the prior art.

The known spindle drive assemblies generally comprise an electric spindle drive by means of which the associated vehicle flap can be opened and/or closed. This means that a user of an associated vehicle no longer needs to manually carry out the opening and/or closing. The user only needs to send an open or close command to the spindle drive assembly, which he/she can do, for example, via a radio remote control or via a switch arranged in the vehicle. A foot switch which is arranged on the outside of the vehicle and can operate without contact can also be used.

Such spindle drive assemblies have to be able to reliably perform a large number of opening and/or closing movements. At the same time, in the field of spindle drive assemblies, the aim is always to construct them as simply as possible, as a result of which a cost-effective manufacture is to be ensured. Obviously, there is a conflict of objectives between these requirements, so that known spindle drive assemblies that are especially reliable cannot usually be manufactured particularly cost-effectively, and vice versa.

SUMMARY OF THE INVENTION

The object of the invention is to overcome this conflict of objectives and to indicate a spindle drive assembly which can be manufactured simply and cost-effectively and which also operates particularly reliably.

The object is achieved by a spindle drive assembly of the type initially mentioned, in which a spindle drive assembly housing extends along a spindle drive axis, and a spindle drive motor which is arranged in the spindle drive assembly housing and the motor shaft of which is arranged substantially coaxially with the spindle drive axis is supported in the spindle drive assembly housing in a rotationally fixed manner in relation to the spindle drive axis by means of an interlocking fit. This support by an interlocking fit serves, among other things, to support or react to the driving torque of the spindle drive motor in the spindle drive assembly housing. Interlocking elements can be manufactured particularly simply and with little effort on the spindle drive motor and on the spindle drive assembly housing, so that the spindle drive assembly altogether can be manufactured comparatively simply and with little effort. Moreover, an interlocking fit functions particularly reliably. In particular, unlike a frictional connection, for example, it is not subject to aging or loosening phenomena. This ensures a long service life of the spindle drive assembly.

In one embodiment, the spindle drive assembly housing comprises a housing cap and the spindle drive motor is supported at the housing cap in a rotationally fixed manner. The housing cap, which is a component part of the spindle drive assembly housing, is more particularly connected with a housing body so as to be rotationally fixed. For example, the housing cap is laser welded to the housing body. Thus, in this embodiment as well, a reliable mounting of the spindle drive motor is ensured. This allows the spindle drive assembly to be operated reliably. Furthermore, the housing cap can usually be designed relatively freely, so that an interlocking element on the housing cap side can be realized particularly easily and cost-effectively.

Preferably, the housing cap closes the spindle drive assembly housing axially on an end side. In particular, this provides a watertight and dustproof spindle drive assembly housing. It protects the components of the spindle drive assembly particularly effectively against any undesirable environmental influences.

The spindle drive motor may be supported in the spindle drive assembly housing by means of at least one damping element. Vibrations emanating from the spindle drive motor can thus be effectively damped before they are introduced into the spindle drive assembly housing. In other words, the spindle drive motor is vibration-decoupled from the spindle drive assembly housing. During operation of the spindle drive assembly, the spindle drive assembly housing therefore is, in particular, free of vibrations or exhibits only minor vibrations. In addition, a noise radiation of the spindle drive motor is reduced or prevented by the damping elements. The result is a particularly quiet spindle drive assembly that can be operated with low vibration. Such an assembly is perceived as being of high quality. Moreover, it operates reliably.

In one variant, the spindle drive motor is supported in the spindle drive assembly housing by means of a motor housing. The interlocking element on the spindle drive motor side is thus provided at the motor housing, more precisely at a brush housing of the spindle drive motor. Such an interlocking element can be manufactured there with little effort. In this way, an effective torque support is also ensured. The same applies to the fastening of the spindle drive motor in the spindle drive assembly housing.

In this context, the motor housing may have at least two anti-rotation projections provided thereon which, in the mounted state of the spindle drive motor, extend substantially along the spindle drive axis and engage in associated recesses provided on the spindle drive assembly housing. The anti-rotation projections feature a distance of greater than zero from the spindle drive axis. Projections and recesses are simple and cost-effective to produce.

The motor housing is preferably made from a plastic material.

Preferably, the anti-rotation projections are circular cylindrical, with associated circular cylinder center axes extending substantially parallel to the spindle drive axis in the mounted state of the spindle drive motor. Such anti-rotation projections are particularly simple to produce. Furthermore, they can be simply inserted into associated recesses during assembly.

The anti-rotation projections may engage in the recesses via elastic damping caps arranged on the anti-rotation projections or via elastic damping elements arranged in the recesses. In this way, a vibration decoupling or at least a vibration damping between the spindle drive motor and the spindle drive assembly housing is achieved. The damping elements have a particularly simple geometry.

Preferably, the damping elements are made from an elastomer.

In one variant, the anti-rotation projections are provided on an axial end side of the spindle drive motor facing away from the motor shaft. In other words, the anti-rotation projections are provided on the rear side of the spindle drive motor. In this way, a mutual interference between the rotationally fixed mounting of the spindle drive motor and the torque collection from the motor shaft of the spindle drive motor is effectively avoided.

In addition, a first electrical power connection of the spindle drive motor and/or a second electrical power connection of the spindle drive motor and/or a sensor connection of the spindle drive motor may be provided on an axial end side of the spindle drive motor facing away from the motor shaft. Since the anti-rotation projections can be designed to be comparatively small, a sufficiently large installation space remains free for power connections and/or sensor connections. This allows the spindle drive motor to be constructed to be relatively compact. The arrangement of the connections on the axial end side makes them particularly easily accessible, in particular within the scope of the assembly process.

Furthermore, the object is achieved by a vehicle flap of the type initially mentioned, in particular a vehicle hatch or tailgate or vehicle trunk lid, which includes a spindle drive assembly according to the invention. Since the spindle drive assembly is structured in a simple and cost-effective manner, a vehicle flap fitted with it is consequently also structured to be comparatively simple and cost-effective. Furthermore, such a vehicle flap is particularly reliable in operation.

In addition to the above-mentioned vehicle flaps, luggage flaps or tailgates of sport utility vehicles or commercial vehicles may also be fitted with a spindle drive assembly according to the invention. The same applies to engine hoods and vehicle front gates.

BRIEF DESCRIPTION OF THE DRAWINGS

The invention will be discussed below with reference to an exemplary embodiment shown in the accompanying drawings, in which.

DETAILED DESCRIPTION OF THE INVENTION

Figure 1:
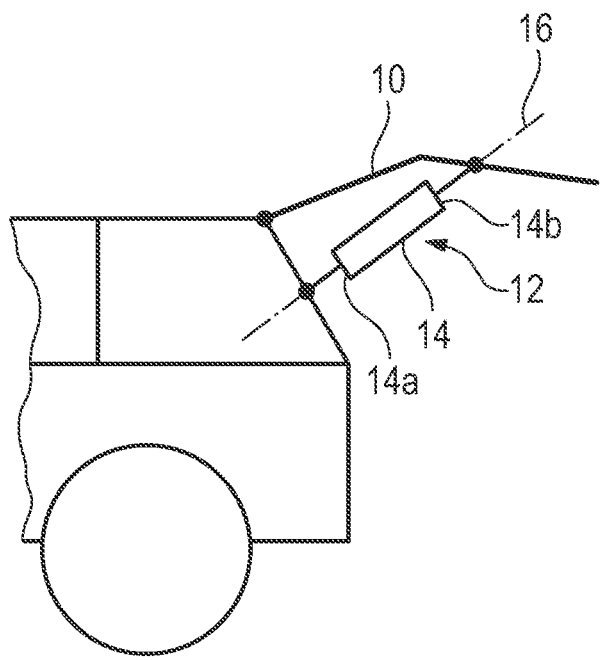
FIG. 1 schematically shows a vehicle flap according to the invention with a spindle drive assembly according to the invention that is assembled by means of a method according to the invention.

FIG. 1 shows a vehicle flap 10, which in the present case is a vehicle hatch or liftgate, having a spindle drive assembly 12 by means of which the vehicle flap 10 can be opened and/or closed.

The spindle drive assembly 12 comprises a spindle drive assembly housing 14 that extends along a spindle drive axis 16.

Figure 2:
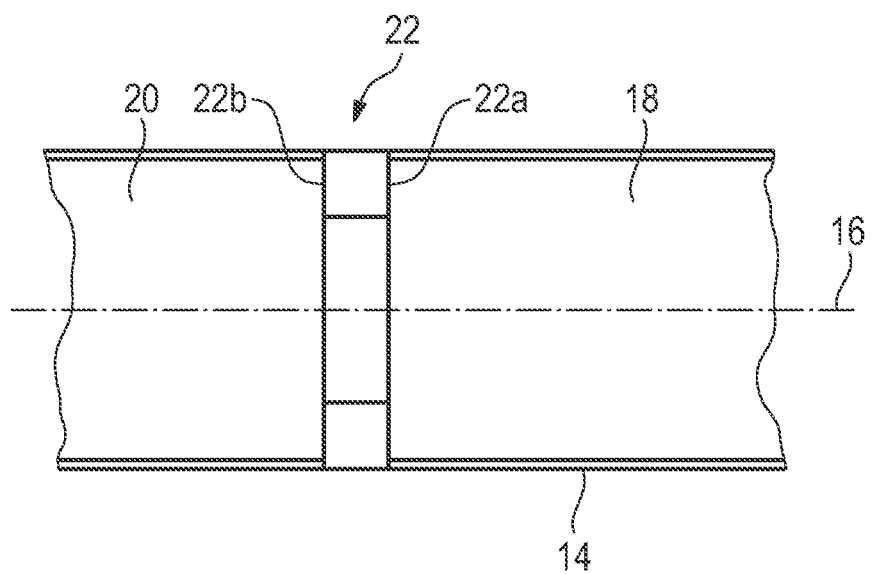
FIG. 2 shows the spindle drive assembly from FIG. 1 in a schematic sectional view.

As can be seen in particular by reference to FIG. 2, a motor gear unit 18, only schematically illustrated in FIG. 2, and a spindle unit 20, also only schematically illustrated in FIG. 2, are arranged in the spindle drive assembly housing 14.

The spindle drive assembly housing 14 here comprises, between its axial ends 14a, 14b, a stop section 22 acting axially on both sides.

The motor gear unit 18 is arranged on a first axial side 22a of the stop section 22 and the spindle unit 20 is arranged on a second axial side 22b opposite the first axial side 22a.

Both the motor gear unit 18 and the spindle unit 20 rest against the stop section 22.

Figure 3:
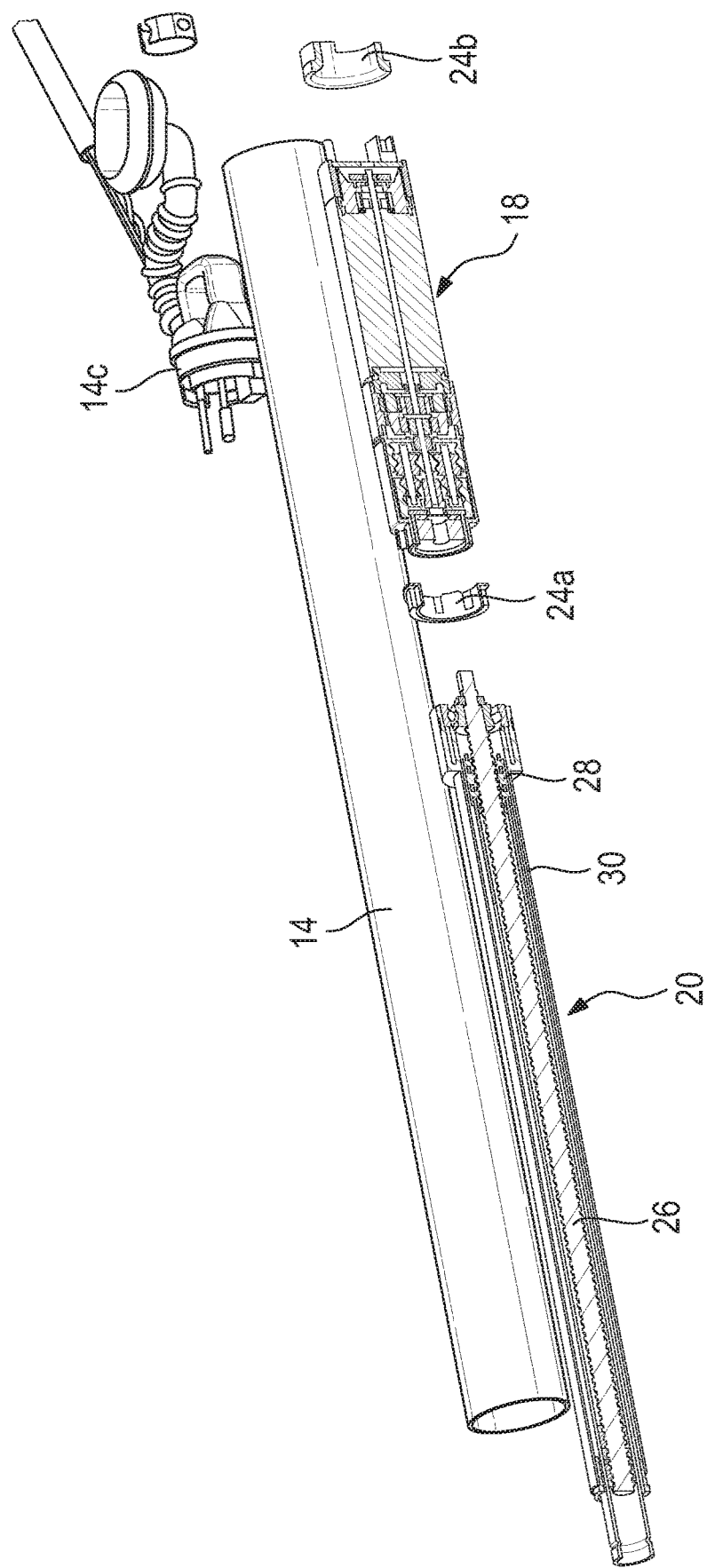
FIG. 3 shows the spindle drive assembly from FIG. 1 in an exploded representation.
Figure 4:
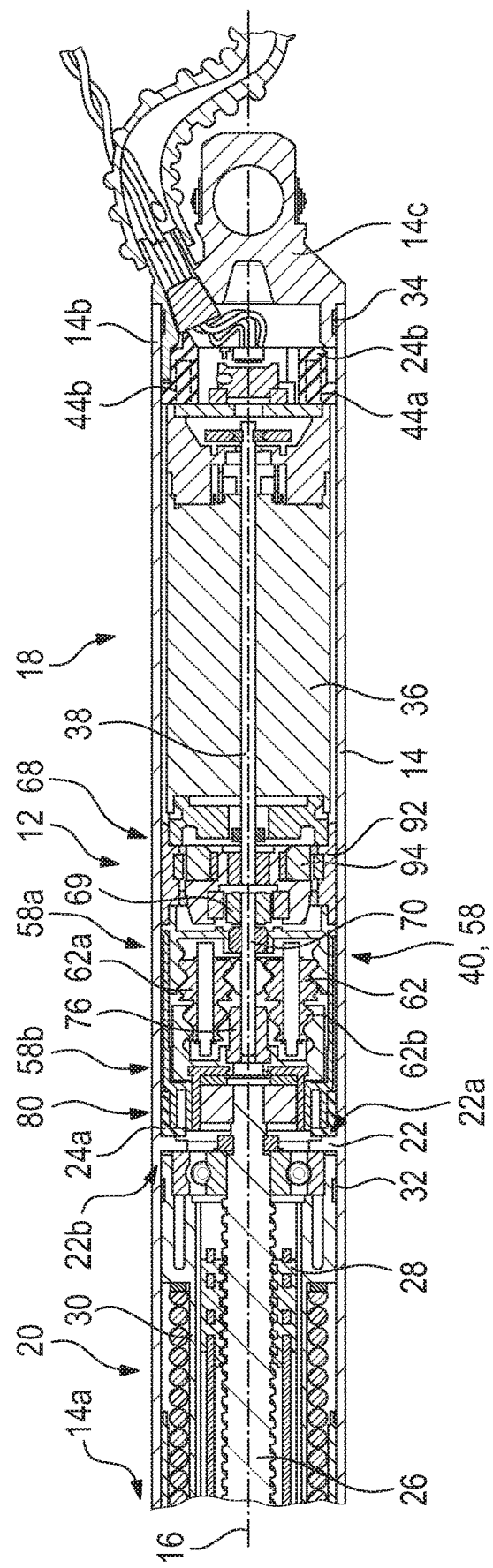
FIG. 4 shows the spindle drive assembly from FIG. 1 in a sectional detail view.

In the illustrated embodiment (see in particular FIGS. 3 and 4), the motor gear unit 18 is supported in the spindle drive assembly housing 14 by means of two damping elements 24a, 24b made from an elastomer.

In addition to a spindle 26 and a spindle nut 28 coupled thereto, the spindle unit 20 comprises a guide tube 30.

In the illustrated embodiment, the guide tube 30 is fastened to the spindle drive assembly housing 14. More precisely, the guide tube 30 is laser welded to the spindle drive assembly housing 14. The laser weld seam 32 is drawn in only schematically here.

The stop section 22 is produced in one piece with the spindle drive assembly housing 14.

Here, the spindle drive assembly housing 14 is made from a plastic material.

In the present case, the stop section 22 is manufactured by injection molding the spindle drive assembly housing 14.

The spindle drive assembly housing 14 additionally comprises a housing cap 14c. It closes the spindle drive assembly housing 14 on the motor gear unit side.

The housing cap 14c and the spindle drive assembly housing 14 are laser welded. The laser weld seam 34 is again drawn only schematically here.

The assembly of the spindle drive assembly 12 is performed as follows.

First, the spindle drive assembly housing 14 is provided.

Then the motor gear unit 18 is inserted into the spindle drive assembly housing 14 starting from a first axial side of the spindle drive assembly housing 14 on which, in the example shown, the axial end 14b is located.

In doing so, the motor gear unit 18 is placed against the first axial side 22a of the stop section 22.

The spindle unit 20 is inserted into the spindle drive assembly housing 14 from a second axial side 22b of the spindle drive assembly housing 14 opposite to the first axial side thereof. In the illustrated embodiment, the axial end 14a is located on this side.

The spindle unit 20 is placed against the second axial side 22b of the stop section 22.

It is irrelevant to the assembly process whether first the motor gear unit 18 or first the spindle unit 20 is mounted to the spindle drive assembly housing 14. The motor gear unit 18 and the spindle unit 20 may also be mounted essentially simultaneously.

When the spindle unit 20 has been inserted in the spindle drive assembly housing 14, it is fastened in it. In the illustrated embodiment, the spindle unit 20 comprises a guide tube 30 that is fastened to the spindle drive assembly housing 14 by means of the laser weld seam 32.

That is, the spindle drive assembly housing 14 and the guide tube 30 are laser welded.

Subsequently, the spindle drive assembly housing 14 is closed at its end 14b using a housing cap 14c. In this context, the spindle drive assembly housing 14 is laser welded to the housing cap 14c.

The motor gear unit 18 comprises a spindle drive motor 36, which is coupled to a gearing 40 via a motor shaft 38.

Figure 5:
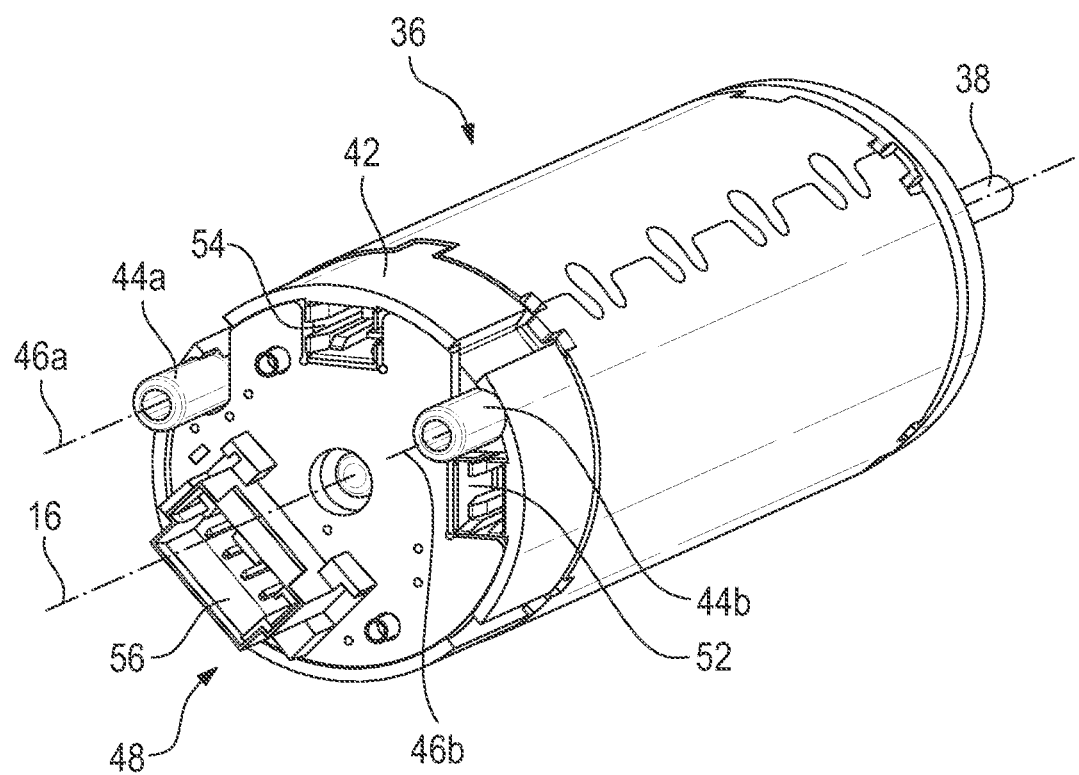
FIG. 5 shows a spindle drive motor of the spindle drive assembly from FIG. 1 in a perspective view.
Figure 6:
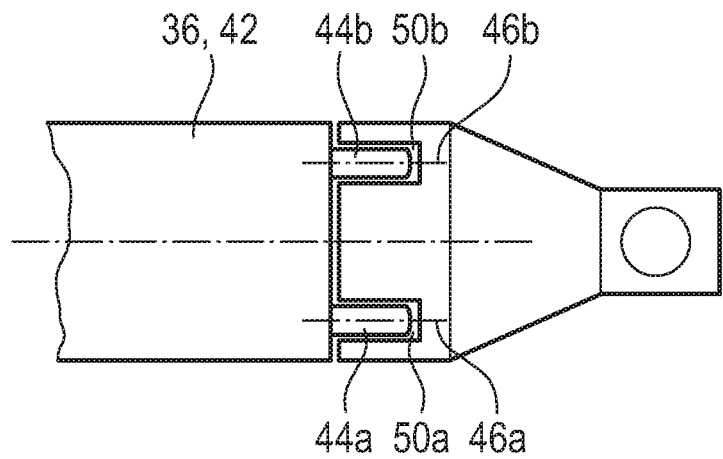
FIG. 6 schematically shows the interaction of the spindle drive motor from FIG. 5 with a spindle drive assembly housing in a partly sectional illustration.
Figure 7:
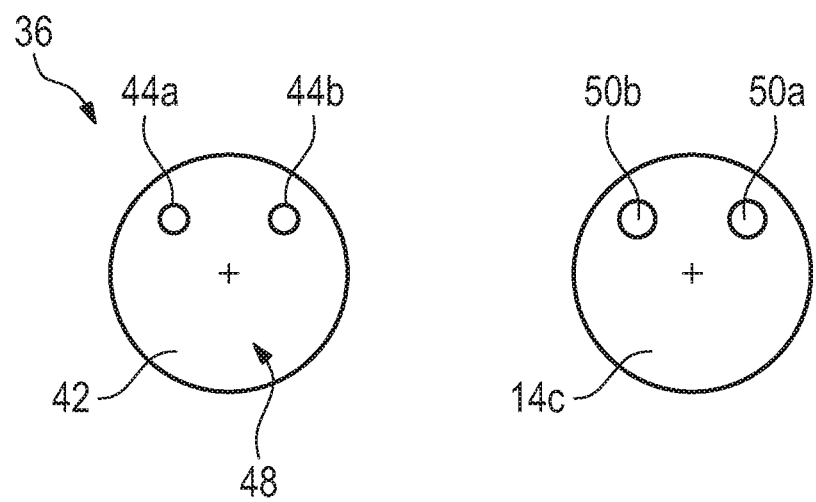
FIG. 7 schematically shows an end view of the spindle drive motor from FIGS. 5 and 6 and of a housing cap adapted to be connected with the spindle drive motor.

FIGS. 5-7 show the spindle drive motor 36 in detail.

With the motor gear unit 18 arranged within the spindle drive assembly housing 14, the spindle drive motor 36 is also positioned within the spindle drive assembly housing 14. The motor shaft 38 here is substantially coaxial with the spindle drive axis 16.

In addition, the spindle drive motor 36 and thus the motor gear unit 18 are supported in the spindle drive assembly housing 14 so as to be rotationally fixed with respect to the spindle drive axis 16 by means of an interlocking fit.

More precisely, the spindle drive motor 36 is supported at the housing cap 14c in a rotationally fixed manner by means of an interlocking fit, the housing cap being a component part of the spindle drive assembly housing 14.

The rotationally fixed mounting is provided here by means of a motor housing 42 of the spindle drive motor 36.

In the illustrated embodiment, it has two anti-rotation projections 44a, 44b provided thereon which, in the assembled state of the spindle drive motor 36 and thus also of the motor gear unit 18, extend substantially along the spindle drive axis 16.

In the present case, the anti-rotation projections 44a, 44b are circular cylindrical, with the associated circular cylinder center axes 46a, 46b extending substantially parallel to the spindle drive axis 16 in the mounted state of the spindle drive motor 36.

The anti-rotation projections 44a, 44b are provided on an axial end side 48 of the spindle drive motor 36 facing away from the motor shaft 38. In the assembled state, the anti-rotation projections 44a, 44b are thus positioned on a side of the spindle drive motor 36 opposite to the gearing 40.

In the assembled state, the anti-rotation projections 44a, 44b engage in associated recesses 50a, 50b provided on the spindle drive assembly housing 14.

In the illustrated embodiment, the recesses 50a, 50b are provided on the housing cap 14c.

More precisely, in the illustrated embodiment, the recesses 50a, 50b are provided on the damping element 24b, which is connected to the housing cap 14c in a rotationally fixed manner.

As an alternative, the anti-rotation projections 44a, 44b may engage in the recesses 50a, 50b via elastic damping caps arranged on the anti-rotation projections 44a, 44b or via elastic damping elements arranged in the recesses 50a, 50b.

As is apparent in particular by reference to FIG. 5, in the illustrated embodiment, besides the anti-rotation projections 44a, 44b, a first electrical power connection 52, a second electrical power connection 54 and a sensor connection 56 are additionally provided on the axial end side 48 of the spindle drive motor 36.

Figure 8:
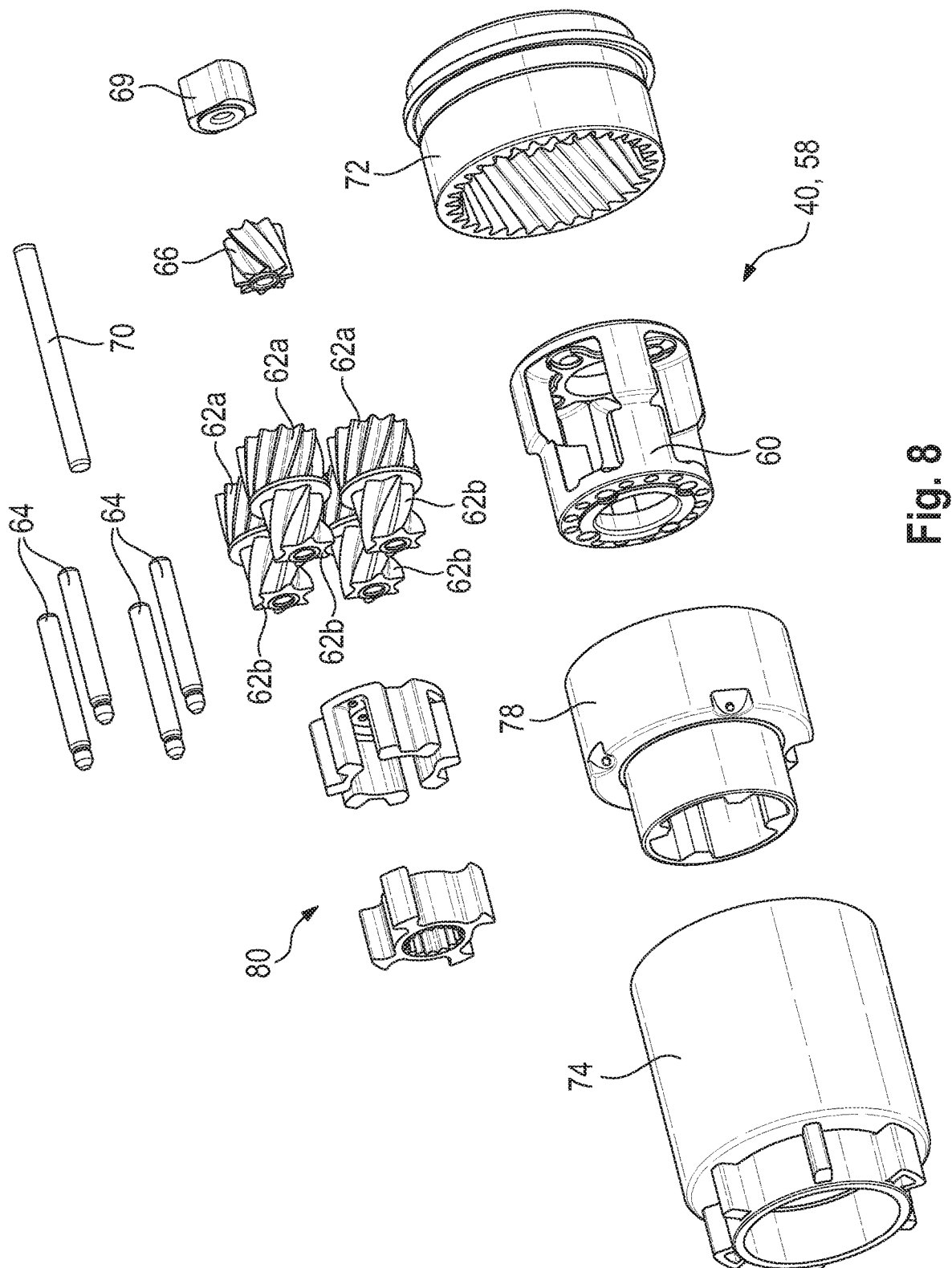
FIG. 8 shows an exploded illustration of a two-stage epicyclic gearing of the spindle drive assembly from FIG. 1, which can be assembled by means of a method according to the invention.
Figure 9:
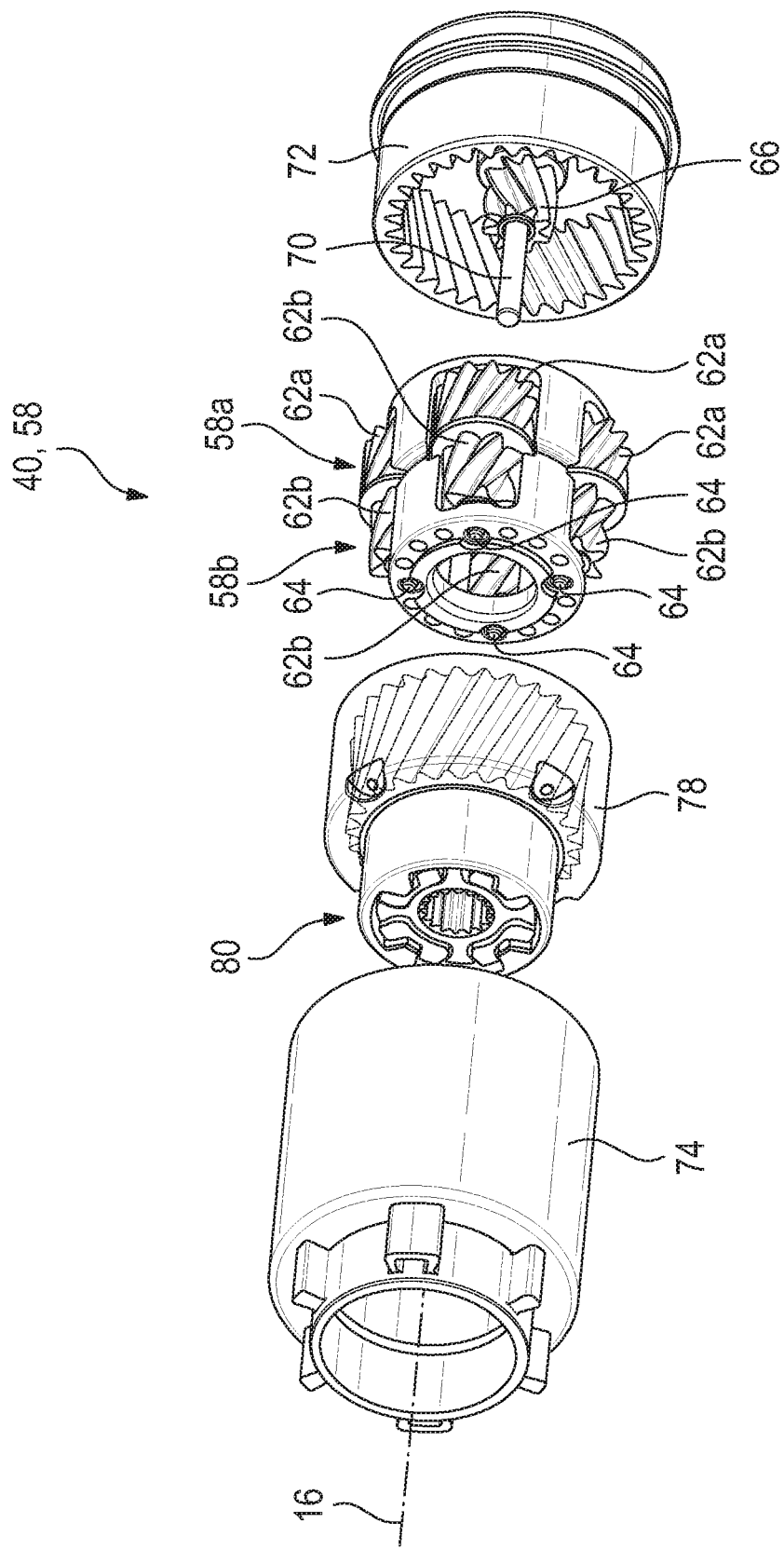
FIG. 9 shows a further exploded illustration of the two-stage epicyclic gearing of the spindle drive assembly from FIG. 1, with the epicyclic gearing partly assembled by means of a method according to the invention.

FIGS. 8 and 9 show the gearing 40 in detail.

It can be seen here that the gearing 40 is a two-stage epicyclic gearing 58.

In this context, it comprises a first epicyclic gearing stage 58a, which is also referred to as motor-side or drive-side epicyclic gearing stage 58a, and a second epicyclic gearing stage 58b, which is also referred to as spindle-side or driven-side epicyclic gearing stage 58b.

The epicyclic gearing 58 has helical toothings. Both epicyclic gearing stages 58a, 58b have helical toothings in the same direction.

Moreover, the two-stage epicyclic gearing 58 comprises merely one single, singular planet carrier 60, which is thus part of both epicyclic gearing stages 58a, 58b.

Furthermore, both the motor-side epicyclic gearing stage 58a and the spindle-side epicyclic gearing stage 58b comprise an equal number of planet gears 62a, 62b. In the exemplary embodiment shown, each of the epicyclic gearing stages 58a, 58b comprises four planet gears 62a, 62b.

One respective planet gear 62a of the first epicyclic gearing stage 58a and one respective planet gear 62b of the second epicyclic gearing stage 58b are mounted on a shared planet gear pin 64.

The planet gears 62a, 62b mounted on a shared planet gear pin 64 are connected to each other for joint rotation.

The epicyclic gearing 58 operates as follows.

The motor shaft 38 is rotationally coupled to a sun gear 66 of the motor-side epicyclic gearing stage 58a. Thus, the sun gear 66 constitutes the drive or torque input of the epicyclic gearing 58.

Since this coupling is effected via a clutch or coupling 68, strictly speaking a gearing input shaft 70 is coupled to the sun gear 66. However, it may be regarded as a continuation of the motor shaft 38.

In the illustrated embodiment, the coupling 68 is an Oldham coupling for compensating an axial offset. FIG. 8 only shows a gearing-side coupling part 69, which is connected with the gearing input shaft 70.

The sun gear 66 cooperates with the planet gears 62a of the motor-side epicyclic gearing stage 58a, which in turn are coupled to a ring gear 72 of the motor-side epicyclic gearing stage 58a.

The ring gear 72 is mounted so as to be rotationally fixed and axially fixed in the spindle drive assembly housing 14 and/or in an epicyclic gearing housing 74. This means that the ring gear 72 is substantially positioned fixed in space.

The motor-side epicyclic gearing stage 58a is coupled to the spindle-side epicyclic gearing stage 58b both via the singular planet carrier 60 and via the one-piece planet gears 62a, 62b.

Here, the spindle-side epicyclic gearing stage 58b is constructed without a sun gear.

The planet gears 62b of the spindle-side epicyclic gearing stage 58b are only radially supported on an axial bearing extension 76 of the sun gear shaft of the motor-side epicyclic gearing stage 58a. The sun gear shaft here corresponds to the gearing input shaft 70.

The planet gears 62b of the spindle-side epicyclic gearing stage 58b are further coupled to a ring gear 78 of the spindle-side epicyclic gearing stage 58b.

This ring gear 78 is rotationally coupled to the spindle 26 by means of a coupling 80. The ring gear 78 is mounted for rotation in the spindle drive assembly housing 14 and/or in the epicyclic gearing housing 74.

The ring gear 78 thus constitutes the output or torque output of the epicyclic gearing 58.

The epicyclic gearing 58 can be assembled as follows.

First, all planet gears 62a, 62b of the two epicyclic gearing stages 58a, 58b are fitted in the singular planet carrier 60.

Subsequently, the planet carrier 60 is inserted into the ring gear 72 of the drive-side epicyclic gearing stage 58a or into the ring gear 78 of the driven-side epicyclic gearing stage 58b.

Then, the respective other ring gear, that is, the ring gear 78 or the ring gear 72, is placed on this component assembly.

Thereafter, the epicyclic gearing housing 74 is provided and connected with the ring gear 72.

In the illustrated embodiment, the epicyclic gearing housing 74 is laser welded to the ring gear 72 in a lap joint. For this purpose, the epicyclic gearing housing 74 is laser light transmissive.

For the spindle drive assembly 12 to emit noises when operating that a motor vehicle user will perceive as pleasant, the ratio of the number of teeth of each of the planet gears 62a of the first epicyclic gearing stage 58a to the number of teeth of each of the planet gears 62b of the second epicyclic gearing stage 58b is selected to be 2:1.

In the illustrated embodiment, each planet gear 62a of the first epicyclic gearing stage 58a comprises twelve teeth and each planet gear 62b of the second epicyclic gearing stage 58b comprises six teeth.

The ratio of 2:1 corresponds to the interval of an octave when it is based on a ratio of sound frequencies.

Given that the sound frequency emitted by the first epicyclic gearing stage 58a is decisively determined by the number of teeth of the planet gears 62a of the first epicyclic gearing stage 58a and the sound frequency emitted by the second epicyclic gearing stage 58b is decisively determined by the number of teeth of the planet gears 62b of the second epicyclic gearing stage 58b, the spindle drive assembly 12 thus emits sound frequencies in operation which form an octave. This is perceived as particularly pleasant by vehicle users.

In addition, a vehicle user will associate such pleasant noises with a high level of quality of spindle drive assembly 12.

Alternatively, the ratio of the number of teeth of each of the planet gears 62a of the first epicyclic gearing stage and the number of teeth of each of the planet gears 62b of the second epicyclic gearing stage may also be selected to be 3:2, 4:3, 5:4, or 6:5.

The emitted sound frequencies then form a fifth, a fourth, a major third or a minor third, respectively. These intervals are also perceived as pleasant by humans.

Generally speaking, the ratio of the number of teeth of each planet gear 62a of the first epicyclic gearing stage 58a to the number of teeth of each planet gear 62b of the second epicyclic gearing stage 58b is selected such that, in operation, a first sound frequency that is emitted by the first epicyclic gearing stage 58a differs by an integer multiple of a semitone from a second sound frequency that is emitted by the second epicyclic gearing stage 58b.

The preferred embodiment of the octave comprises twelve semitone steps, that of the fifth seven, that of the fourth five, that of the major third four and that of the minor third three.

Figure 10:
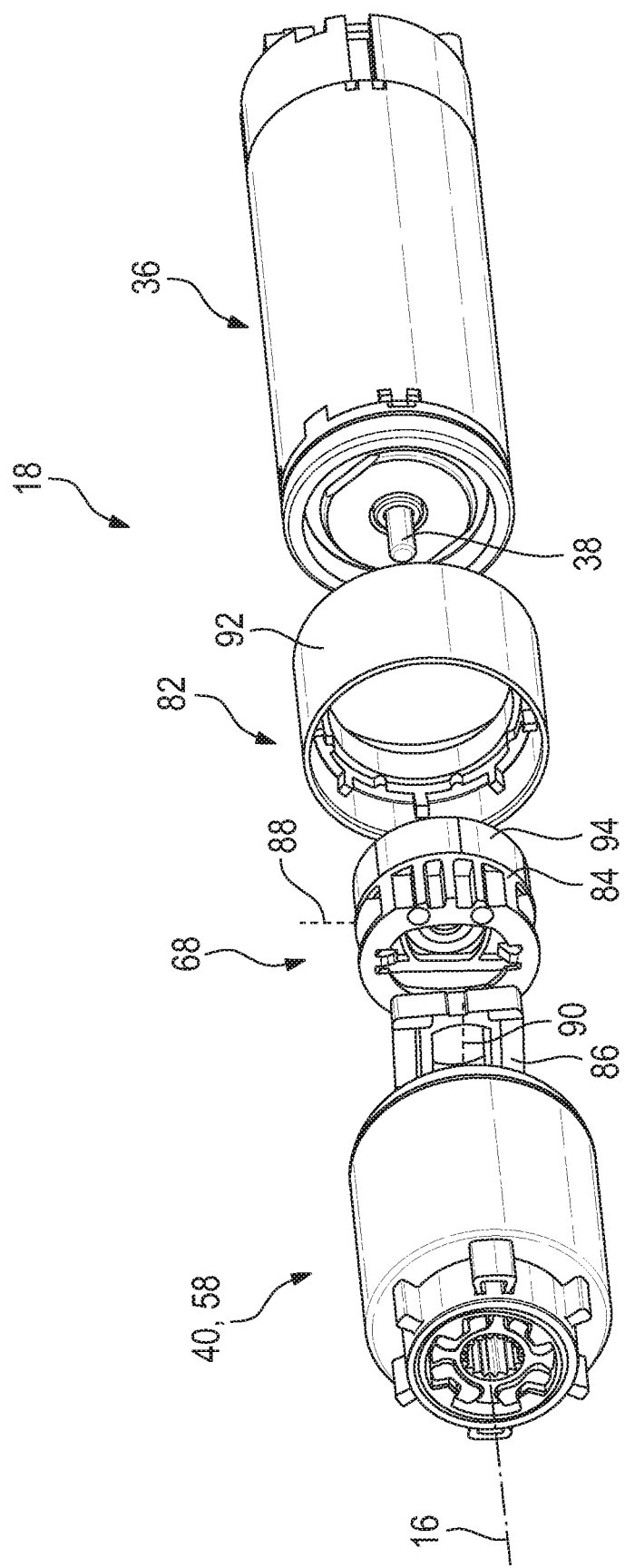
FIG. 10 shows an exploded illustration of the spindle drive assembly from FIG. 1, comprising a two-stage epicyclic gearing, a coupling, a hysteresis brake and a spindle drive motor.
Figure 11:
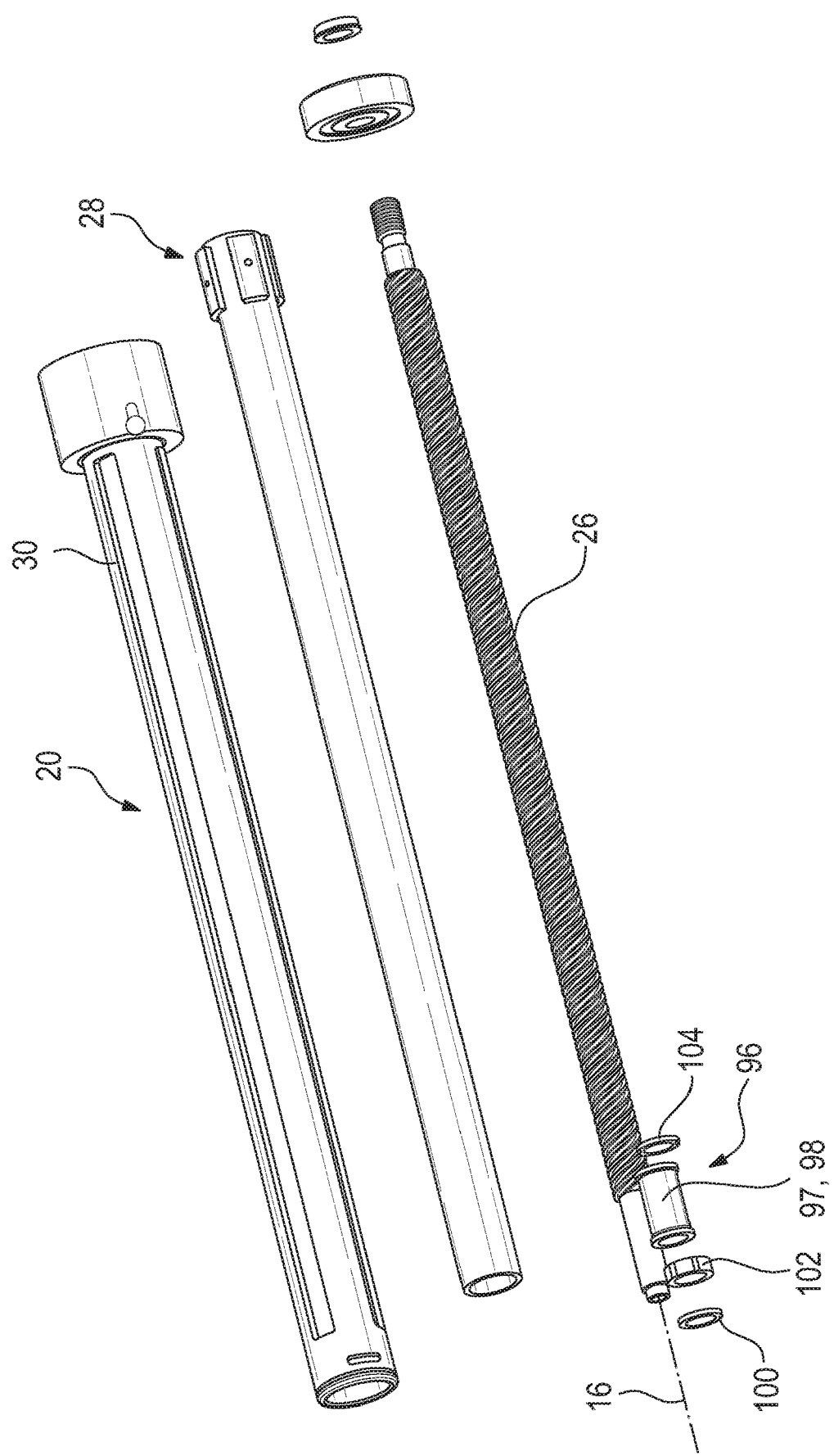
FIG. 11 shows a spindle unit of the spindle drive assembly from FIG. 1 in an exploded illustration.

The coupling of the spindle drive motor 36 to the gearing 40, more precisely to the two-stage epicyclic gearing 58, is illustrated in detail in FIG. 10. Here, the coupling 68 compensating an axial offset and a hysteresis brake 82 are drivingly interposed between the spindle drive motor 36 and the gearing 40.

As already mentioned, the coupling 68 is an Oldham coupling and comprises a coupling part 84 on the drive motor side and the coupling part 69 on the gearing side (see FIG. 8).

The two coupling parts 69, 84 are connected to each other via an intermediate coupling part 86 such that the motor shaft 38 and the gearing input shaft 70 are connected to each other for joint rotation.

At the same time, when in the mounted state, the intermediate coupling part 86 is displaceable in relation to the drive motor-side coupling part 84 along a direction 88.

The gearing-side coupling part 69 is displaceable in relation to the intermediate coupling part 86 along a direction 90.

The direction 88 and the direction 90 are substantially orthogonal to each other here. In this way, an axial offset between the motor shaft 38 and the gearing input shaft 70 can be compensated in line with the operating principle of an Oldham coupling.

The hysteresis brake 82 comprises a stationary hysteresis brake component 92, which is fastened to the spindle drive assembly housing 14 and/or to the epicyclic gearing housing 74.

Furthermore, the hysteresis brake 82 includes a rotatable hysteresis brake component 94 rotationally coupled to the motor shaft 38.

The hysteresis brake component 94 is fastened to or integrated in the drive motor-side coupling part 84. More particularly, the rotatable hysteresis brake component 94 is injected into the drive motor-side coupling part 84.

When the spindle drive assembly 12 is viewed perpendicularly to the spindle drive axis 16, the coupling 68 is arranged substantially completely within the hysteresis brake 82 in the axial direction, in particular, within the stationary hysteresis brake component 92. The structure of the coupling 68 and the hysteresis brake 82 is therefore especially compact.

FIGS. 11-14 show the spindle unit 20 in detail.

Here, a stop assembly 96 arranged at one axial end of the spindle 26 is adapted to limit a mobility of the spindle nut 28 along the spindle drive axis 16. Specifically, in this way the spindle nut 28 is prevented from moving beyond the end of the spindle 26.

The stop assembly 96 comprises a plastically deformable energy absorption component 97, which in the illustrated embodiment is in the form of an energy absorption sleeve 98, which surrounds the spindle 26 substantially coaxially.

This means that the energy absorption sleeve 98 is mounted at the spindle 26.

Figure 14:
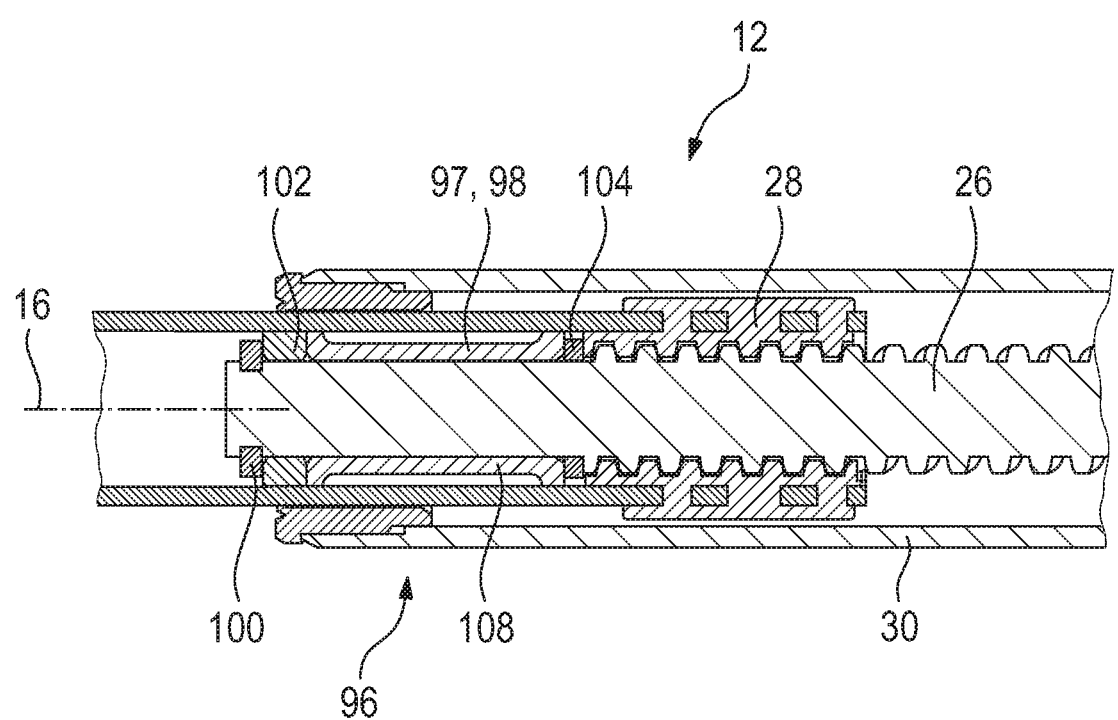
FIG. 14 shows a further detail of the spindle drive assembly from FIG. 1 in a sectional illustration.

The energy absorption sleeve 98 is arranged between a bearing washer 100 on the spindle end side and the spindle nut 28 along the spindle drive axis 16 (see, in particular, FIG. 14).

Moreover, a bearing member 102 is provided between the energy absorption sleeve 98 and the bearing washer 100 to support the spindle 26 at the spindle drive assembly housing 14.

In addition, a thrust washer 104 that is axially displaceable on the spindle 26 is arranged between the energy absorption sleeve 98 and the spindle nut 28.

In the illustrated embodiment, both the bearing washer 100 and the thrust washer 104 are made of a metal material.

At each of its two axial ends, the energy absorption sleeve 98 has a respective collar 106a, 106b configured as a force introduction collar.

A deformation section 108 adapted to be upset in the direction of the spindle drive axis 16 is positioned between the collars 106a, 106b.

In the illustrated embodiment, the deformation section includes only one single deformation portion. In alternative embodiments, however, it may comprise several, in particular two, deformation portions, with both deformation portions being adapted to be upset in the direction of the spindle drive axis 16.

Figure 12:
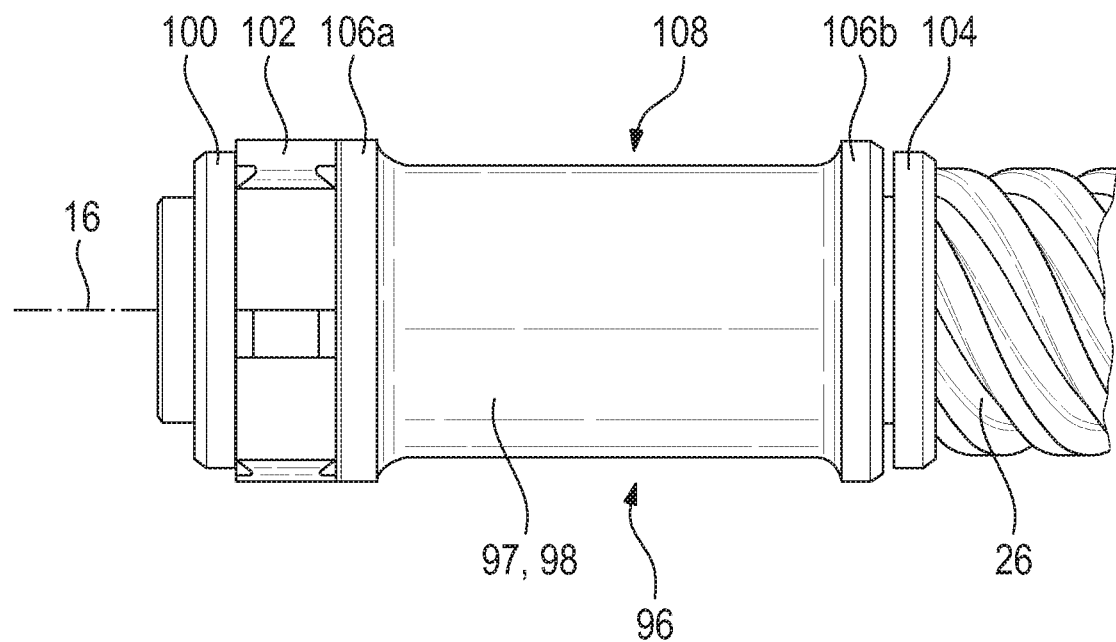
FIG. 12 shows a detail of the spindle unit from FIG. 11.
Figure 13:
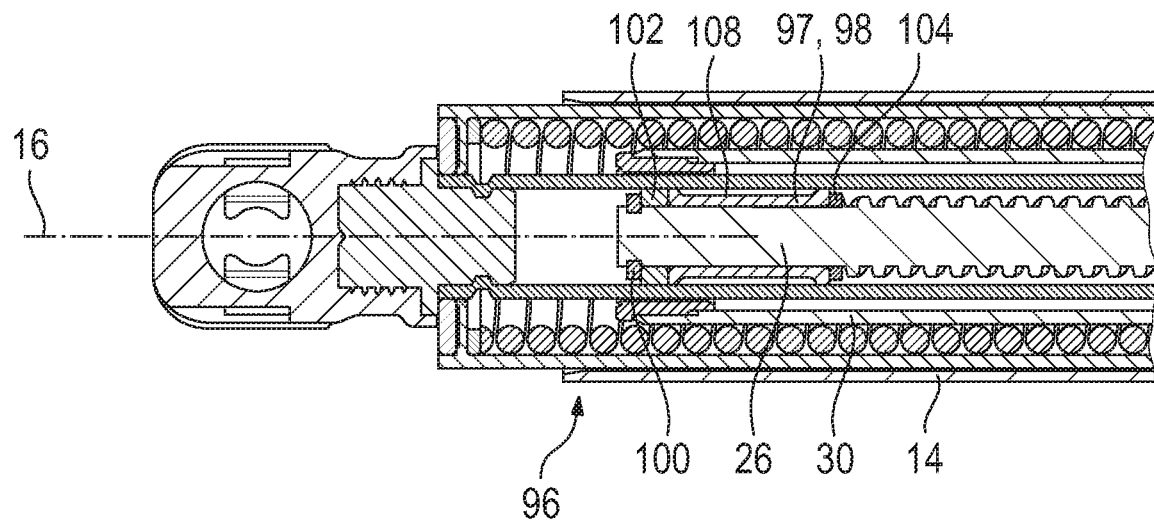
FIG. 13 shows a detail of the spindle drive assembly from FIG. 1 in a sectional illustration.

In a regular operation of the spindle drive assembly 12, the energy absorption sleeve 98 is essentially plastically undeformed (see, in particular, FIGS. 12 to 14). In regular operation, preferably loads on the energy absorption sleeve 98 occur here which exclusively involve forces of less than 750 N.

A load on the energy absorption sleeve 98 with a force of essentially more than 3000 N constitutes an overload event for the illustrated embodiment. This causes the energy absorption sleeve 98 to be plastically deformed.

Such an overload event occurs when the spindle nut 28 runs up against the stop assembly 96, more precisely the energy absorption sleeve 98, at too high a speed and/or too high a force.

This may happen, for example, when the hysteresis brake 82 is defective.

An overload event may also occur during installation of the vehicle flap 10 when the spindle drive assembly 12 is already connected with the vehicle flap 10, but further components of the vehicle flap 10 are still missing. The vehicle flap 10 is then significantly more lightweight than during operation of an associated vehicle, for which the spindle drive assembly 12 is designed. In this connection, the spindle drive assembly 12 may be transferred to an open position by means of a spring that is not further specified. Due to the relatively low weight of the vehicle flap, the spindle nut 28 will then run up against the stop assembly 96 too quickly.

In all overload events, the energy absorption sleeve 98 absorbs the energy resulting from the excessive speed and/or excessive force and thereby protects the other components of the spindle drive assembly group 12 from damage.

FIG. 14 illustrates the spindle nut 28 resting against the energy absorption sleeve 98. However, for reasons of greater clarity, the latter is shown in its plastically undeformed state.

A subsequent operation of the spindle drive assembly 12 in which the opening and closing of the vehicle flap 10 is still possible without any problems is also referred to as an overload sequential operation. In this operating condition the energy absorption sleeve 98 is plastically deformed (not illustrated).

In the event that the energy absorption sleeve 98 comprises a plurality of deformation portions, only one of the deformation portions is plastically deformed in the overload sequential operation.

In case a second overload event occurs subsequently and the energy absorption sleeve 98 comprises a second deformation portion, the latter will deform plastically due to the second overload event. Subsequently, the spindle drive assembly 12 will enter a secondary overload sequential operation, in which the opening and closing of the vehicle flap 10 by means of the spindle drive assembly 12 continues to be ensured.

The invention claimed is:

1. A spindle drive assembly for opening or closing a vehicle flap, comprising a spindle drive assembly housing extending along a spindle drive axis and a spindle drive motor which is arranged in the spindle drive assembly housing and a motor shaft of which is arranged substantially coaxially with the spindle drive axis, wherein the spindle drive motor is supported in the spindle drive assembly housing in a rotationally fixed manner in relation to the spindle drive axis by means of an interlocking fit, wherein the spindle drive assembly housing comprises a housing cap for closing the spindle drive assembly housing, wherein the spindle drive motor is directly connected to the housing cap in a rotationally fixed manner.

2. The spindle drive assembly according to claim 1, characterized in that the housing cap closes the spindle drive assembly housing axially on an end side.

3. The spindle drive assembly according to claim 1, characterized in that the spindle drive motor is supported in the spindle drive assembly housing by means of at least one damping element.

4. The spindle drive assembly according to claim 1, characterized in that the spindle drive motor is supported in the spindle drive assembly housing by means of a motor housing.

5. The spindle drive assembly according to claim 4, characterized in that the motor housing has at least two anti-rotation projections provided thereon which, in a mounted state of the spindle drive motor, extend substantially along the spindle drive axis and engage in associated recesses provided on the spindle drive assembly housing.

6. The spindle drive assembly according to claim 5, characterized in that the anti-rotation projections are cylindrical, with associated cylinder center axes extending substantially parallel to the spindle drive axis in the mounted state of the spindle drive motor.

7. The spindle drive assembly according to claim 5, characterized in that the anti-rotation projections are provided on an axial end side of the spindle drive motor facing away from the motor shaft.

8. The spindle drive assembly according to claim 1, characterized in that a first electrical power connection of the spindle drive motor or a second electrical power connection of the spindle drive motor or a sensor connection of the spindle drive motor are provided on an axial end side of the spindle drive motor facing away from the motor shaft.

9. A vehicle flap comprising the spindle drive assembly according to claim 1.

10. The vehicle flap according to claim 9 that is a vehicle hatch or tailgate or vehicle trunk lid.

* * * * *

UNITED STATES PATENT AND TRADEMARK OFFICE
CERTIFICATE OF CORRECTION

| | |
|---|---|
| PATENT NO. | : 11,480,004 B2 |
| APPLICATION NO. | : 16/768126 |
| DATED | : October 25, 2022 |
| INVENTOR(S) | : Frank Kummer |

It is certified that error appears in the above-identified patent and that said Letters Patent is hereby corrected as shown below:

On the Title Page

Item [71], delete "U-SHIN DEUTSCHLAND ZUGANSGSSYSTEME GMBH" and insert --U-SHIN DEUTSCHLAND ZUGANGSSYSTEME GMBH--.

Signed and Sealed this
Twenty-first Day of March, 2023

Katherine Kelly Vidal
Director of the United States Patent and Trademark Office